(No Model.)

H. A. CROSSLEY.
BRAKE FOR MOTOR CARS.

No. 432,020. Patented July 15, 1890.

Witness,
Abner Slutz
John A. Burke

Inventor,
Harry A. Crossley,
By Geo. W. Tibbitts, Atty.

UNITED STATES PATENT OFFICE.

HARRY A. CROSSLEY, OF CLEVELAND, OHIO.

BRAKE FOR MOTOR-CARS.

SPECIFICATION forming part of Letters Patent No. 432,020, dated July 15, 1890.

Application filed April 18, 1890. Serial No. 348,568. (No model.)

*To all whom it may concern:*

Be it known that I, HARRY A. CROSSLEY, a citizen of the United States, residing at Cleveland, in the county of Cuyahoga and State of Ohio, have invented certain new and useful Improvements in Street-Car Brakes, of which the following is a specification.

This invention relates to brake mechanism for motor street-cars in which the momentum of the car is employed as the power for applying the brakes; and the invention consists in the novel constructions and combinations, as hereinafter described, and pointed out in the claims.

Figure 1:
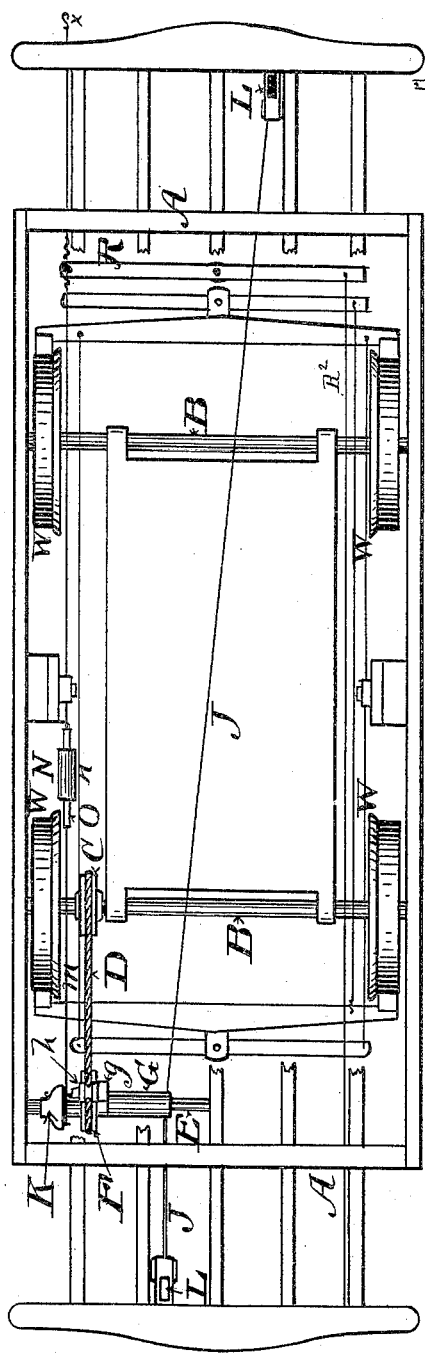
Figure 2:
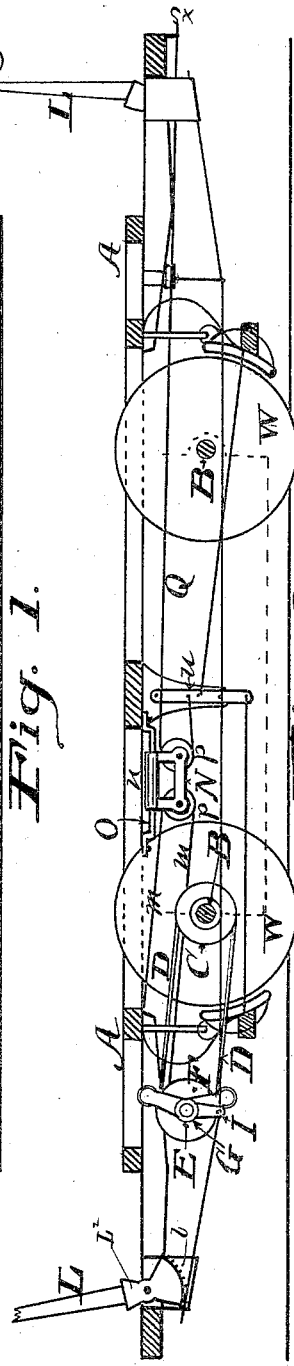
Figure 3:
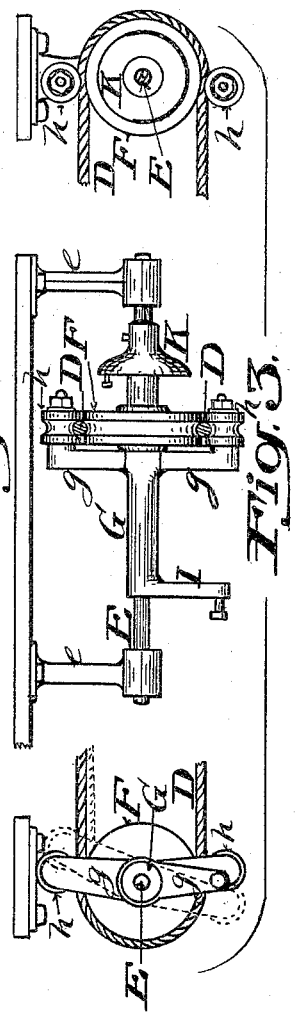

In the accompanying drawings, Figure 1 is a top or plan view of a car-truck having my invention attached. Fig. 2 is a longitudinal section of same. Fig. 3 is an enlarged view of the clutch mechanism, by means of which the brakes are applied.

A represents the frame-work of a car-floor. B B are car-axles, and W W are the car-wheels. On one of the axles I fix a grooved pulley-wheel C, from which I connect a belt D, for obtaining power for operating the brakes. E is a short parallel shaft suspended by suitable hangers e e beneath the end of the car-body. On said shaft is fixed a similar grooved pulley-wheel F, over which the aforesaid belt D runs. By the side of said wheel F on the shaft is loosely placed a sleeve G, having two oppositely-extending arms g g, upon the outer ends of which are placed friction-rollers h h, turning on wrist-pins on the ends of said arms. These rollers are grooved and have a bearing on the belt, as seen in Fig. 3. On the other end of sleeve G is made a crank I, which is connected by rods J J with hand-levers L L at each end of the car, by means of which the said friction-roller mechanism is manipulated.

K is a half-spool fixed on the shaft E, to which is attached the cord or chain m from the brake mechanism.

N is a pulley-carrying frame, having a tube or sleeve n fixed to slide on a bar O, attached to the frame of the truck, and has two pulley-wheels p p, over one of which the cord or chain m passes, said cord being returned and having its end fastened to a beam or other portion of the frame of the truck.

Q is a second cord or chain having one end attached to the brake-lever u, is passed over the other pulley, and reaches back to and is connected to one end of a brake-lever R, from which it passes on to end of car, and having a hook x, by which it may be attached to a cord or chain from a brake mechanism on a trail-car. From the opposite end of lever R is attached a rod $R^2$, leading to opposite end of the car, and is also provided with a hook, and is designed for use in connecting with the brake mechanism of a trail-car when a trail-car follows that end of the car.

The hand-lever is removably attached to a segmental head $L^2$, trunnioned in a box l, fixed in the floor of the platform, and is suitably connected with rods J. The object of having the hand-lever removable is because the brake mechanism is designed to be operated from either end of the car, and it is not desired to have a lever at the rear end of a car at the same time there is one at the front, for fear of its being meddled with.

The brake-levers and brake mechanism are similar to that now in use. My invention is designed for working in conjunction therewith.

The working of this mechanism is as follows: By pulling on the hand-lever L at either end of the car the friction-rollers are made to press upon the belt, in the one case on the top side of the pulley-wheel F, through the medium of rod J and crank I, thereby tightening the belt D upon the wheels, and thus causing the shaft E to rotate and wind the cord or chain m upon the spool, drawing the pulley-carrying frame N, thence drawing upon brake-lever u, which acts upon the brake-beams and clamps the car-wheels. By pulling on the hand-lever L on the opposite end of the car the friction-roller on the under side of the wheel F tightens the belt D on the under side and produces the same effect on the brake mechanism. This is designed for adapting my invention for use on cars which are designed to run with either end forward.

Having described my invention, I claim as follows:

1. In power-brake mechanism for motor-cars, the combination of the axle of the car, provided with a fixed grooved wheel, a parallel shaft having a like grooved wheel and connected by a loose belt with said axle-wheel, a clutch mechanism consisting of a loose sleeve on said shaft having arms carrying friction-rollers bearing on said belt, and also having a crank-arm connected with hand-levers on the ends of the car, by means of which the belt may be tightened for transmitting power from the car-axle to said shaft, substantially as and for the purpose set forth.

2. In power-brake mechanism for motor-cars, the combination, with the car-axle, of a parallel shaft having a grooved wheel mounted upon it and connected by a slack belt with a similar grooved wheel on the car-axle, a clutch mechanism constructed substantially as described, and operated by hand-levers from either end of the car, and a spool mounted on said shaft and suitably connected with the brake mechanism, whereby when the belt is tightened the rotation of said shaft and spool applies the brakes, substantially as set forth.

3. In a power-brake mechanism for motor-cars, the combination of a shaft having a grooved wheel mounted thereon and connected by a slack belt with a grooved wheel on the car-axle, a clutch mechanism, constructed and arranged substantially as described, for tightening said belt, a spool mounted on said shaft, and a chain or cord connecting the spool with a sliding pulley-frame mounted on the truck, and a second cord or chain connecting said sliding frame with the brake mechanism, and also leading to the rear and connected to one end of a transverse lever R, the opposite end of said lever connected with a rod $R^2$, leading to opposite end of the car, for the purpose of connecting the power mechanism with a trail-car from either end of the motor-car, substantially as and for the purpose set forth.

4. The segmental head $L^2$, trunnioned in box $l$, fixed in the floor of the car-platform and connected with the power-brake mechanism, and having a socket for a removable hand-lever L, substantially as described.

5. In power-brake mechanism for street-cars, in combination, a shaft E, having grooved wheel F, mounted thereon and supported in hangers $e\ e$ and connected by slack belt D with a like grooved wheel C on axle B of car-truck, a clutch mechanism consisting of sleeve G, loosely mounted on shaft E and provided with arms $g\ g$, carrying friction-rollers $h\ h$, bearing on said belt, and having crank I, suitably connected with hand-levers L, and a spool K, mounted on shaft E and connected by cord or chain $m$ with sliding pulley-frame N and by cord or chain Q with brake-lever $u$, which is connected with and applies the brakes to the wheels W W, substantially as set forth.

HARRY A. CROSSLEY.

Witnesses:
ABNER SLUTZ,
GEO. W. TIBBITTS.